UNITED STATES PATENT OFFICE.

JAKOB SCHMID, OF BASLE, SWITZERLAND, ASSIGNOR TO THE SOCIETY OF CHEMICAL INDUSTRY IN BASLE, OF SAME PLACE.

BLACK TRISAZO DYE.

SPECIFICATION forming part of Letters Patent No. 557,437, dated March 31, 1896.

Application filed September 5, 1895. Serial No. 561,573. (Specimens.) Patented in France March 9, 1894, No. 236,886, and in England January 19, 1895, No. 4,460.

*To all whom it may concern:*

Be it known that I, JAKOB SCHMID, a citizen of Switzerland, residing at Basle, Switzerland, have invented new and useful Improvements in the Production of Black Trisazo Dyestuffs or Coloring-Matters, (for which Letters Patent have been received in France, No. 236,886, dated March 9, 1894, and in England, No. 4,460, dated January 19, 1895,) of which the following is a specification.

In United States Patent No. 525,626, dated September 4, 1894, I have described the production of mixed blue-black disazo dyes derived from one molecule of a tetrazo compound, one molecule of monosulfodioxynaphthoic acid, (United States Patent No. 493,562, dated March 14, 1893,) and one molecule of amidonaphtholsulfo-acids, such as amidonaphtholsulfo-acid G, 2.8 amidonaphthol 3.6 disulfo-acid 2 R, 1.8 amidonaphthol 3.6 disulfo-acid. I have found that these disazo dyes by further diazotation and combination with amins and phenols are transformed into new and valuable black trisazo dyestuffs which produce deep and fast blue-black shades on unmordanted cotton.

In carrying out my invention practically I proceed, for instance, as follows: The disazo dye obtained from 1.84 kilos of benzidin, 2.84 kilos of monosulfodioxynaphthoic acid, and 2.6 kilos of amidonaphtholmonosulfo-acid G, substantially as specified in the above-mentioned United States patent, No. 525,626, is dissolved in about four hundred liters of water. Into the cooled solution 2.5 kilos of muriatic acid and a solution of 0.7 kilo of sodium nitrite are introduced. After some hours the formation of the diazo compound is complete and it is separated in the form of black flakes. The thus resulting diazo compound is allowed to run into a cold solution of 1.2 kilos of metaphenylenediamin, or metatoluylenediamin, or metaämidophenol or resorcin kept alkaline by an excess of carbonate of soda.

The new trisazo dyestuff separates out from the solution and is filtered off and dried.

In an analogous manner other trisazo coloring-matters will be obtained which correspond to the general formula

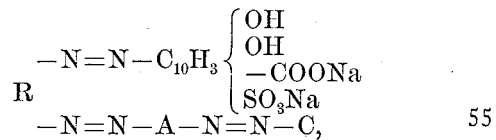

where R signifies the radicle of benzidin, tolidin, ethoxybenzidin, diamidodiphenol ether, diamidodiphenylamin, A the radicle of an amidonaphtholsulfo-acid, and C the radicle of an amin or phenol.

The new dyestuffs form black powders of metallic luster easily soluble in hot water with a blue-black coloration, insoluble in alcohol, ether, and benzene. In concentrated sulfuric acid they dissolve with a dark green blue coloration, from which solution on addition of water the free color acid separates out in the form of black precipitates and dyes deep black shades on unmordanted cotton.

What I claim as new, and desire to secure by Letters Patent, is—

The new black trisazo coloring-matters which correspond to the general formula—

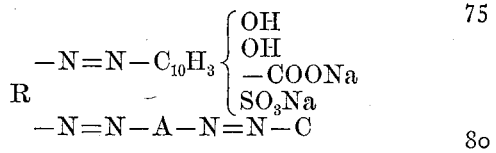

and which form black powders with a metallic luster easily soluble in hot water with a blue-black coloration, insoluble in alcohol, ether and benzene; in concentrated sulfuric acid they dissolve with a dark green blue coloration from which solution the free color acid separates out in the form of a black precipitate, and they dye deep black shades on unmordanted cotton, substantially as described.

In testimony whereof I have hereunto set my hand in the presence of two subscribing witnesses.

JAKOB SCHMID.

Witnesses:
 GEORGE GIFFORD,
 FRITZ WALTERS.